United States Patent [19]

Sustic et al.

[11] Patent Number: 5,714,554
[45] Date of Patent: Feb. 3, 1998

[54] HIGH TENSILE STRENGTH AMORPHOUS 1-BUTENE/PROPYLENE AND ETHYLENE/PROPYLENE COPOLYMERS

[75] Inventors: Andres Sustic; George C. Allen, both of Odessa, Tex.

[73] Assignee: Rexene Corporation, Dallas, Tex.

[21] Appl. No.: 483,498

[22] Filed: Jun. 7, 1995

Related U.S. Application Data

[63] Continuation of Ser. No. 226,280, Apr. 11, 1994, abandoned, which is a continuation-in-part of Ser. No. 941,916, Sep. 8, 1992, Pat. No. 5,302,675.

[51] Int. Cl.$^6$ ............... C08F 4/649; C08F 210/16
[52] U.S. Cl. ............................................. 526/125.3
[58] Field of Search ........................ 526/125, 125.3

[56] References Cited

U.S. PATENT DOCUMENTS

| | | | |
|---|---|---|---|
| 3,271,376 | 9/1966 | Achon et al. | 526/128 |
| 3,595,842 | 7/1971 | Schrage et al. | 526/128 |
| 4,347,158 | 8/1982 | Kaus et al. | 526/125 |
| 4,451,688 | 5/1984 | Kuroda et al. | 526/125 |
| 4,736,002 | 4/1988 | Allen et al. | 526/125 |
| 4,847,340 | 7/1989 | Allen et al. | 526/348 |
| 4,859,757 | 8/1989 | Pellon et al. | 526/348 |
| 5,278,118 | 1/1994 | Cuffiana et al. | 526/125.3 |

FOREIGN PATENT DOCUMENTS

| | | |
|---|---|---|
| 335484 | 10/1989 | European Pat. Off. . |
| 59-206421 | 11/1984 | Japan . |
| 886368 | 12/1959 | United Kingdom . |
| 1016192 | 1/1966 | United Kingdom . |

OTHER PUBLICATIONS

Translation of Japanese Kokai Pantent 59–206421.

*Primary Examiner*—Edward J. Smith
*Attorney, Agent, or Firm*—Harold E. Meier

[57] ABSTRACT

Amorphous propylene/1-butene and ethylene/propylene copolymers having increased tensile properties produced by the process comprising:

reacting propylene and 1-butene monomers or ethylene and propylene monomers in the presence of a catalyst system comprising:

(a) a solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0;

(b) a trialkylaluminum co-catalyst, having from 1 to 9 carbon atoms in each alkyl group in an amount such that the Al/Ti ratio is between about 50:1 and about 500:1; and (c) an alkoxy silane component of the formula $R_nSi(OR')_{4-n}$ where n=1-3, R=aryl or alkyl and R'=$C_{1-3}$ alkyl.

3 Claims, 1 Drawing Sheet

HIGH TENSILE STRENGTH AMORPHOUS 1-BUTENE/PROPYLENE AND ETHYLENE/PROPYLENE COPOLYMERS

This is a continuation of application Ser. No. 08/226,280, filed Apr. 11, 1994, now abandoned which is a Continuation-In-Part of prior application Ser. No. 07/941,916, filed Sep. 8, 1992 and issued as U.S. Pat. No. 5,302,675 on Apr. 12, 1994.

TECHNICAL FIELD

This invention relates to substantially improved amorphous propylene/1-butene and ethylene/propylene copolymers that exhibit high tensile strength and storage modulus. Both copolymers have properties which make them applicable for use in a variety of applications including adhesives, sealants, coatings and similar materials.

BACKGROUND

Amorphous polyalphaolefins are presently used in a wide variety of applications including adhesives, sealants and coatings. Additionally, these materials may be blended with other materials to achieve a wide range of desired physical properties. Amorphous polyalphaolefin polymers and processes for making such polymers are disclosed in U.S. Pat. Nos. 4,859,757; 4,847,340 and 4,736,002, the disclosures of which are incorporated herein for all purposes.

There has, however, arisen a need for improved materials with enhanced physical properties. The present invention provides substantially amorphous propylene/1-butene and ethylene/propylene copolymers that exhibit high tensile strength and storage modulus. The enhanced physical properties of the propylene/1-butene and ethylene/propylene copolymers of the present invention substantially broadens the range of applications in which amorphous polyalphaolefin polymers may be used.

SUMMARY OF THE INVENTION

The present invention provides novel propylene/1-butene copolymers and a process for making the propylene/1-butene copolymers. The propylene/1-butene copolymers of the present invention comprise from about 25 to 50 wt % propylene and 75 to 50 wt % of 1-butene and have excellent tensile strength and storage modulus properties. The propylene/1-butene copolymers are completely amorphous, that is, the propylene/1-butene copolymers contain no crystalline fraction as indicated by complete solubility in boiling heptane and do not exhibit any trace of heat of fusion when the heat of fusion is determined by Differential Scanning Calorimetry ("DSC") in accordance with ASTM test method D-3417. The propylene/1-butene copolymers are produced with a catalyst system comprising a solid supported catalyst component, an organoaluminum co-catalyst and an alkoxy silane component. The alkoxysilane is added to the reactor in a quantity such that the molar ratio of the concentration of the organoaluminum co-catalyst to the alkoxy silane component is 20–45:1, or more preferably, 35–45:1.

The present invention also provides amorphous ethylene/propylene copolymers. The ethylene/propylene copolymers of the present invention comprise from about 10 to about 30 wt. % ethylene and from 90 to 70 wt. % propylene and have excellent tensile strength and storage modulus properties. The amorphous ethylene copolymers are also produced with a catalyst system comprising a solid supported catalyst component, an organoaluminum co-catalyst and an alkoxy silane component. In the case of the ethylene/propylene copolymer, the alkoxy silane is added to the reactor in a quantity such that the molar ratio of the concentration of the organoaluminum co-catalyst to the alkoxy silane component is from about 100:1 to about and preferably from about 300:1 to about 500:1.

DETAILED DESCRIPTION

Figure 1:
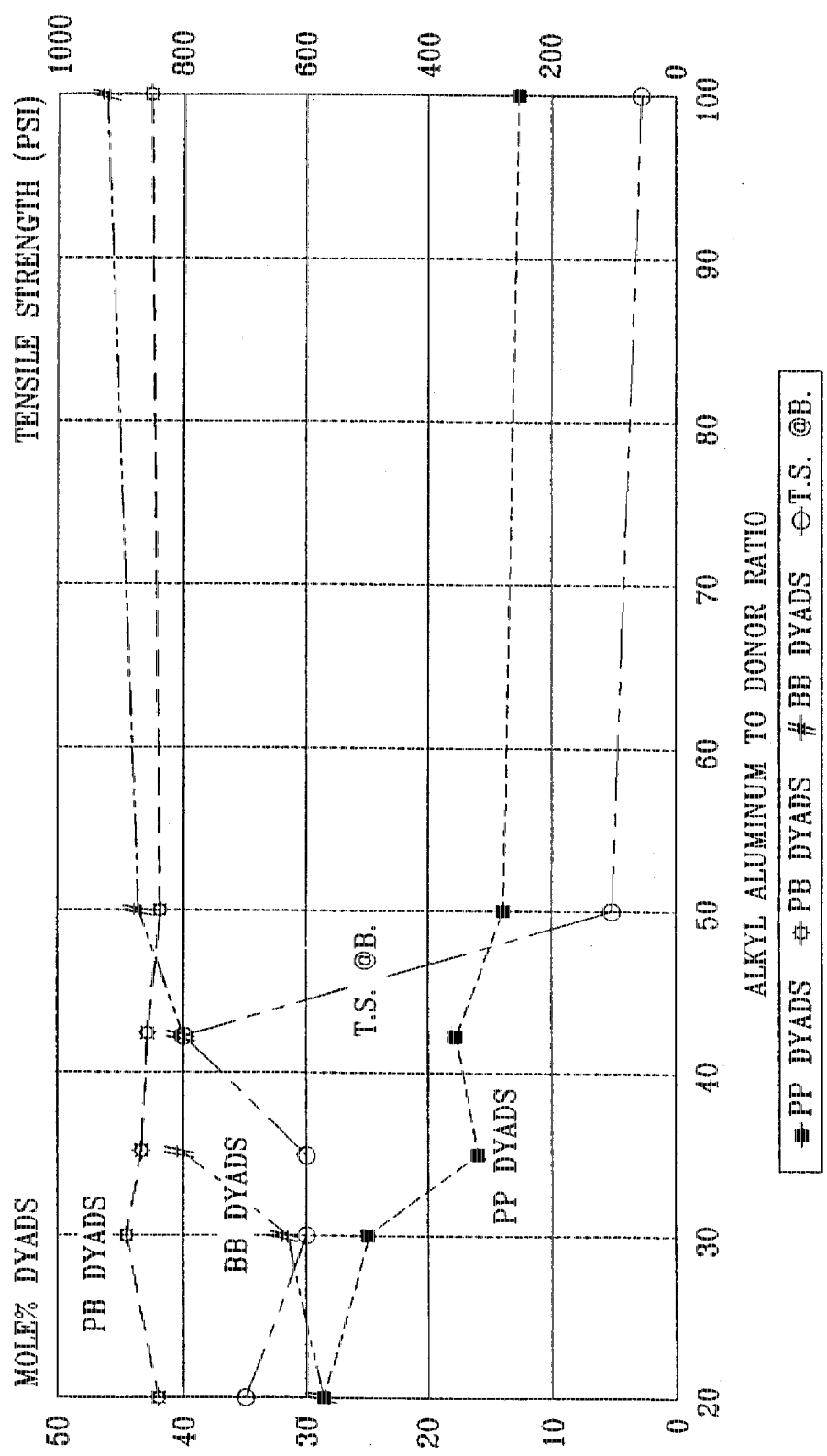
FIG. 1 is a graph illustrating the effect of the addition of an alkoxy silane external donor component during the polymerization of a 1-butene/propylene copolymer.

The present invention provides substantially amorphous propylene/1-butene copolymers comprising from 25 to 50 wt % propylene and from about 75 to 50 wt % of 1-butene. The propylene and 1-butene monomers are polymerized at a temperature between about 130° F. and about 150° F. and a reactor pressure sufficient to maintain the monomers in the liquid phase. The molecular weight of the propylene/1-butene copolymers may be controlled by the addition of an appropriate amount of a chain terminating agent, for example from about 1.0 to about 2.0 mole % hydrogen based on the monomer feed to the process. The polymerization reaction takes place in the presence of a catalyst system comprising:

(a) a solid catalyst component as described in U.S. Pat. No. 4,736,002 modified to exclude the use of added electron donors during the preparation of the catalyst component;

(b) a trialkylaluminum co-catalyst component having from 1 to 9 carbon atoms in each alkyl group in a sufficient quantity to provide an Al/Ti ratio in the range from about 50:1 to about 500:1; and (c) an alkoxy silane external component of structure $R_nSi(OR')_{4-n}$ where n=1–3, R=aryl or alkyl and R'=$C_{1-3}$ alkyl in a sufficient quantity such that the molar ratio of organoaluminum co-catalyst to alkoxysilane is in the range from about 20:1 to about 45:1.

The alkoxy silane is described as an external component since it is added to the reactor independently of the solid catalyst component and the organoaluminum co-catalyst. Although the polymerization can be carried out in a batch reactor, it is preferred to utilize a continuous process. Usually, pressures in the range of 250 psig and 350 psig are suitable for maintaining the monomers in liquid phase.

The addition of an electron donor such as an alkoxy silane would normally be expected to promote the formation of crystalline polymer. However, it was discovered that within a certain ratio of organoaluminum co-catalyst to an external alkoxy silane, substantially amorphous copolymers of propylene and 1-butene with exceptional tensile properties and storage modulus could be produced.

The polymerization is carried out in a stirred reactor at average residence times between 1 hour and 3 hours. Sufficient catalyst quantities are fed to the reactor to result in a polymer content in the reactor slurry of from 10 wt % to about 50 wt %. The reactor effluent is withdrawn from the reactor, and unreacted monomer is flashed from the recovered product polymer.

The solid supported catalyst component has a molar ratio of magnesium chloride to aluminum chloride of about 8:0.5–3.0 and preferably about 8:1.0–1.5. The molar ratio of magnesium chloride to titanium tetrachloride is between about 8:0.1–8:1.0 and preferably about 8:0.4–8:0.6.

The solid catalyst component may be prepared by the general methods described in U.S. Pat. No. 4,347,158, the disclosure of which is incorporated herein for all purposes, except that these methods must be modified to exclude the use of electron donor compounds in the preparation of the catalyst. Briefly, the modified method involves co-comminuting magnesium chloride and aluminum trichloride in the absence of an electron donor and then co-comminuting the catalyst support so formed with titanium tetrachloride, also in the absence of an electron donor. More specifically, the solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.4 to about 8:1.

The solid catalyst component is used in conjunction with a trialkylaluminum co-catalyst, having from 1 to 9 carbon atoms in each alkyl group. The preferred organoaluminum co-catalyst is triethylaluminum. The molar ratio of trialkylaluminum co-catalyst to titanium-containing catalyst component, i.e., Al/Ti ratio, should range between about 50:1 and about 500:1, preferably between about 120:1 and about 170:1.

The alkoxy silane component is introduced as a dilute solution in heptane. The molar ratio of alkyl aluminum co-catalyst to alkoxy silane, e.g., the Al/Si ratio, should range between 20 and 45, preferably between about 35:1 and about 45:1. Alkoxy silanes suitable for use in connection with the present invention include cyclohexyl methyl dimethoxysilane (CMDMS) and phenyl triethoxysilane (PES). Cyclohexyl methyl dimethoxy silane and phenyl triethoxy silane are available from HuelsAmerica, Inc., Piscataway, N.J. 08855-0456. Other alkoxy silanes anticipated to be suitable for use in the practice of the present invention include dimethyl diethoxy silane, dodecyl triethoxy silane, methyl phenyl diethoxy silane, dimethyl diisopropenoxy silane, methyl octyl dimethoxy silane and methyl triethoxy silane.

Due to the high activity of the catalyst system employed in the present invention, the process is highly efficient and typically results in polymer production ranging from about 3000 to 6000 lbs. polymer/lb. titanium catalyst. The propylene/1-butene copolymers of the present invention have no determinable heat of fusion, as determined by Differential Scanning Calorimetry ("DSC") in accordance with ASTM test method D-3417, an indication of the amorphous nature of the polymer and the lack of crystallinity in the polymer structure.

The propylene/1-butene copolymers of the present invention have excellent properties making them useful in a variety of applications, such as blending components for adhesives, caulking and sealing compounds and others. Important product properties include melt viscosity, ring and ball softening point, tensile strength and elastic or storage modulus.

The melt viscosity at 375° F. is determined by ASTM test method D-3236 using a Brookfield RVT Viscometer and a #27 spindle. For hot melt adhesives the desired viscosity range is between about 1000 and 12,000 cps at 375° F.

The ring and ball softening point determination is carried out using ASTM E-28 test method. One variable affecting the softening point is butene-1 content of the polymer. A decrease in the butene-1 content causes an increase in the ring and ball softening point.

The tensile strength determination is carried out using ASTM D-638 test method. Typically, the tensile strength values of the copolymers propylene/1-butene of this invention range from about 300 to about 900 psig (2.1 and 6.2 Mpa, respectively). Propylene/1-butene copolymers having such high tensile strength are produced when the Al/Si ratio is maintained with the range of from about 20:1 to about 45:1.

The storage or elastic modulus is determined by ASTM D-4440 test method using a Boelin Reology CSM rheometer. The storage modulus is a measure of the elasticity of a material. The storage modulus values of the propylene/1-butene copolymers of this invention range from about 8.0 to about 14.0 Mpa.

Another indication of the amorphous nature of the copolymers of the present invention is the lack of crystalline polymer as evidenced by the fact that the copolymers contain no heptane insoluble material. Heptane insolubles were determined by Soxhlet extraction of a sample of the copolymer with boiling heptane for six hours.

The invention will be further described with respect to the following Examples; however, the scope of the invention is not to be limited thereby.

EXAMPLES 1–3

Polymerization of propylene and 1-butene was performed in a 200 gallon jacketed continuous pilot plant reactor. The temperature of the reactor was controlled by circulating cooling water in the reactor jacket. The solid supported titanium tetrachloride catalyst component was prepared in accordance with the foregoing description and had a titanium content of from about 2.3 to about 2.7 wt %. Slurriss containing twenty five wt % of the solid catalyst component were prepared in degassed petrolatum. Five wt % alkyl aluminum co-catalyst solutions were prepared in normal heptane as were 0.5 wt % alkoxy silane component solutions.

The alkyl aluminum co-catalyst solution and catalyst slurry were introduced into the reactor continuously, as were hydrogen, propylene and butene-1 monomers and the alkoxy silane solution.

Copolymers recovered were tested as described above. The pertinent operating conditions and test results are set forth in Table 1 below.

TABLE 1

| | EXAMPLE NO. | | |
|---|---|---|---|
| | 1 | 2 | 3 |
| Reactor Temp., °F. | 140 | 140 | 140 |
| Reactor Pres., psig | 250 | 250 | 2.40 |
| Triethylaluminum, mol/hr | 0.27 | 0.27 | 0.27 |
| CMDMS mol/hr | 0.0077 | 0.0062 | 0.0062 |
| Propylene, lbs/hr | 24 | 23 | 22 |
| Butene-1, lbs/hr | 106 | 107 | 108 |
| Hydrogen, lbs/hr | 1.8 | 1.6 | 1.7 |
| Al/Ti, mol ratio | 130 | 145 | 170 |
| Al/Si, mol ratio | 35 | 42 | 42 |
| Catalyst Activity, lbs/lbs cat.* | 4800 | 5900 | 6300 |
| Butene-1 content, wt %** | 62 | 62 | 63 |
| Melt Viscosity, cps | 6550 | 10350 | 12050 |
| Ring and Ball Softening Point, °F. | 200 | 202 | 200 |
| Heat of fusion, J/g | 0 | 0 | 0 |
| Heptane Insolubles, wt. % | 0 | 0 | 0 |

TABLE 1-continued

| | EXAMPLE NO. | | |
|---|---|---|---|
| | 1 | 2 | 3 |
| Tensile Strength, psig | 650 | 875 | 875 |
| % Elongation @ Break | 300 | >669 | 615 |
| Storage Modulus, Mpa | 11 | 11.4 | 12.9 |
| Glass Transition, °C. | −39 | −39 | −38 |

*Based upon solid catalyst component consumption.
**Determined by IR spectroscopy.

The foregoing Examples illustrate the production of an amorphous propylene/1-butene copolymer possessing exceptional tensile and storage modulus properties.

The following Example illustrates the use of phenyl triethoxy silane (PES) as an external component. Propylene and 1-butene monomers were polymerized using the same catalyst system and under the operating conditions as Examples 1–3 except that phenyl triethoxy silane (PES) was substituted for cyclohexyl methyl dimethoxy silane (CMDMS).

Pertinent operating conditions and test results are set forth in Table 2 below.

TABLE 2

| | EXAMPLE NO. 4 |
|---|---|
| Reactor Temp., °F. | 140 |
| Reactor Pres., psig | 200 |
| Triethylaluminum mol/hr | 0.29 |
| PES mol/hr | 0.0076 |
| Propylene, lbs/hr | 24 |
| Butene-1, lbs/hr | 106 |
| Hydrogen, lbs/hr | 1.0 |
| Al/Ti, mol ratio | 150 |
| Al/Si, mol ratio | 38 |
| Catalyst Activity, lbs/lbs cat. | 5200 |
| Butene-1 content*, wt % | 63 |
| Melt Viscosity, cps | 8300 |
| Ring and Ball Softening Point, °F. | 193 |
| Heat of fusion, J/g | 0 |
| Heptane insolubles, wt % | 0 |
| Tensile Strength, psig | 670 |
| % Elongation @ Break | 300 |
| Storage Modulus, Mpa | 12 |
| Glass Transition, °C. | −35 |

*by IR spectroscopy.

As indicated above, the propylene/1-butene copolymer produced evidenced the desired high tensile strength, elongation at break and storage modulus properties.

In order to demonstrate the significance of the Al/Si ratio, propylene/1-butene copolymers were also prepared without the alkoxy silane and at Al/Si ratios of 50 and 100 under the same operating conditions and using the same catalyst system as in Examples 1–3, except that the Al/Si ratio was varied.

Table 3 summarizes the pertinent operating conditions and the results of physical testing.

TABLE 3

| | EXAMPLE NO. | | |
|---|---|---|---|
| | 5 | 6 | 7 |
| Reactor Temp., °F. | 135 | 140 | 140 |
| Reactor Pres., psig | 124 | 185 | 170 |
| Triethylaluminum mol/hr | 0.21 | 0.21 | 0.21 |
| CMDMS mol/hr | 0 | 0.0020 | 0.0040 |
| Propylene, lbs/hr | 26 | 25 | 25 |
| Butene-1, lbs/hr | 106 | 105 | 105 |
| Hydrogen, lbs/hr | 0.90 | 0.90 | 1.7 |
| Al/Ti, mol ratio | 150 | 165 | 150 |
| Al/Si, mol ratio | — | 100 | 50 |
| Catalyst Activity, lbs/lbs cat. | 7900 | 9600 | 8300 |
| Butene-1 content, wt % | 68 | 69 | 68 |
| Melt Viscosity, cps | 8000 | 5250 | 10500 |
| Ring and Ball Softening Point, °F. | 190 | 177 | 176 |
| Heptane Insolubles | 0 | 0 | 0 |
| Heat of fusion, J/g | 0 | 0 | 0 |
| Tensile Strength, psig | 46 | 65 | 92 |
| % Elongation @ Break | 107 | 270 | 120 |
| Storage Modulus, Mpa | N.D. | 2.7 | 3.3 |
| Glass Transition, °C. | −20 | −33 | −33 |

As indicated above, the use of the alkoxy silane in an amount resulting in a Al/Si ratio outside of the desired range of 20:1 to 45:1 resulted in the production of copolymers that did not exhibit the high tensile strength and storage modulus observed in Examples 1–4.

The following Examples further illustrate the significance of the Al/Si ratio in the practice of the present invention. Polymerization of propylene and 1-butene was carried out under the same operating conditions as Examples 1–3 except that the alkoxy silane was added at a rate such that the Al/Si ratio was 20:1 and 30:1.

TABLE 4

| | EXAMPLE NO. | |
|---|---|---|
| | 8 | 9 |
| Reactor Temp., °F. | 140 | 140 |
| Reactor Pres., psig | 310 | 315 |
| Triethylaluminum mol/hr | 0.27 | 0.27 |
| CMDMS mol/hr | 0.013 | 0.0087 |
| Propylene, lbs/hr | 25 | 24 |
| Butene-1, lbs/hr | 105 | 106 |
| Hydrogen, lbs/hr | 2.2 | 1.9 |
| Al/Ti, mol ratio | 130 | 202 |
| Al/Si, mol ratio | 20 | 30 |
| Catalyst Activity, lbs/lbs cat. | 3500 | 3600 |
| Butene-1 content, wt % (by Infrared spectroscopy) | 50 | 52 |
| Butene-1 content, wt % (by $^{13}$C NMR spectroscopy) | 58 | 61 |
| Melt Viscosity, cps | 6650 | 5900 |
| Ring and Ball Softening Point, °F. | 240 | 225 |
| Heptane Insolubles | 0 | 0 |
| Heat of fusion, J/g | 0 | 0 |
| Tensile Strength, psig | 700 | 550 |
| % Elongation @ Break | >650 | 470 |
| Storage Modulus, Mpa | N.D. | N.D. |
| Glass Transition, °C. | −34 | N.D. |

As indicated above, when the alkoxy silane was added at a rate such that the molar ratio of triethylaluminum to alkoxy silane was 20:1 and 30:1, the resulting copolymer exhibited the desired high tensile strength and elongation at break.

One technique for determining the microstructural makeup of organic compounds is through the use of $^{13}C$ (carbon-13) NMR spectroscopy. In particular, in connection with organic polymers, $^{13}C$ NMR spectroscopy assists in the determination of the architecture of the molecules, how different monomers are incorporated in the polymer and the stereochemistry of the polymer. This information may then be used to determine the polymerization mechanism and to understand the nature of the catalyst system. Knowledge of the values for the chemical shifts of the methylene and methine carbon atoms in the polymer's backbone and of the methylene carbon of the ethyl radical in the 1-butene moiety, allow the proper peak assignments and the quantification of the propylene-propylene ("PP"), propylene-butene ("PB") and butene-butene ("BB") dyads for the copolymers of the present invention.

The weight percent propylene, butene, compositional dyad and number-average sequence length determinations in samples of the copolymers of Examples 1, 2 and 5–9 were carried out by using $^{13}CNMR$ spectroscopy measurements. The integrals of two peaks are considered for determination of mole-% propylene and 1-butene in amorphous propylene-butene copolymers. The integral is determined by measuring the distance (usually in mm) between two parallel lines drawn collinear with instrument-generated integral lines. The composition was determined by comparison of the integrated intensities of the primary carbon resonances at ca. 21 ppm and 10.9 ppm downfield from tetramethyl-silane (at 0 ppm) for the propyl and butyl moieties, respectively. The respective integral distances are divided by their sum to give the mole fraction of each respective component. The mole fractions are then used to convert to weight fractions by multiplying the respective mole fraction by the weight of the respective repeat unit (in g/mole). The sum of these two numbers is then used to generate the weight-% values similar to the mole-% method mentioned above.

The integrals of three different peaks are used to determine the PP, PB, and BB compositional dyads. The integral values are determined as described above. The peaks that are integrated are centered at ca. 46.8 ppm (PP compositional dyad), ca. 43.6 ppm (PB dyad) and ca. 40.2 ppm (BB dyad). The sum of the integral values is then used to determine the mole fractions and mole percentages as described above.

The mole fractions from dyad determinations are used to determine the number-average sequence lengths of P ($\bar{N}_p$) and B ($\bar{N}_b$). See Randall, J. C. *Macromolecules*, 3, 592 (1978) for original details. The following equations are used for the sequence length determination:

$$\bar{N}_p = (PP + 0.5\ PB)/0.5\ PB \quad (1)$$

$$\bar{N}_b = (BB + 0.5\ PB)/0.5\ PB \quad (2)$$

The results of analysis of the copolymers of Examples 1, 2 and 5–9 using $^{13}C$ NMR spectroscopy are set forth in Table 5 below:

TABLE 5

| | EXAMPLE NO. | | | | | | |
|---|---|---|---|---|---|---|---|
| | 1 | 2 | 5 | 6 | 7 | 8 | 9 |
| Al/Si Mole Ratio | 35 | 42 | —[1] | 100 | 50 | 30 | 20 |
| wt % propyl* | 33.8 | 32.6 | 30.5 | 29.4 | 28.9 | 39.2 | 41.2 |
| wt % butyl* | 66.3 | 67.4 | 69.5 | 70.6 | 71.2 | 60.8 | 58.8 |
| PP dyads (mole %) | 16.5 | 18 | 15.1 | 12.7 | 14.1 | 25.0 | 28.7 |
| $\bar{N}_p$ | 1.75 | 1.85 | 1.72 | 1.60 | 1.67 | 2.14 | 2.35 |
| PB dyads (mole %) | 43.5 | 42.4 | 42 | 42.2 | 42.4 | 43.8 | 42.6 |
| BB dyads (mole %) | 40.0 | 39.6 | 42.9 | 45.1 | 43.6 | 31.2 | 28.2 |
| $\bar{N}_b$ | 2.84 | 2.87 | 3.04 | 3.14 | 3.06 | 2.92 | 2.35 |
| Storage Modulus, MPa | 11.0 | 11.4 | — | 2.7 | 3.3 | N.D. | N.D. |
| Tensile Strength @ Break, psi | 650 | 875 | 46 | 65 | 92 | 590 | 700 |
| % Elongation @ Break, % | >670 | 300 | 107 | 270 | 120 | 470 | >670 |

[1] no donor present.
*by $^{13}C$ NMR spectroscopy)

Comparison of the values shown for the PP and the BB dyads indicates the propylene and 1-butene monomers are apparently incorporated differently in the presence of the alkoxy silane external donor component in the desired Al/Si ratio. Comparison of copolymers of Examples 1, 2, 8 and 9 with the copolymers of Examples 5–7 indicates that the copolymers of the present invention contain a higher percentage of PP dyads and a lower percentage of BB dyads than copolymers polymerized with no alkoxy silane external donor component (Example 5), or with an amount of the donor component outside of the desired range. For example, the copolymers of Examples 1, 2, 8 and 9 contained greater than 16% percent PP dyads, while the PP dyad percentage of the copolymers of Examples 5–7 ranged from 12.7 to 15.1. The copolymers of Examples 1, 2, 8 and 9 also contained 40.0% or less of BB dyads, while the BB dyad percentage of the copolymers of Examples 5–7 ranged from 42.9 to 45.1. Additionally, the values for $\bar{N}_p$ and $\bar{N}_b$ appear to indicate that the copolymers polymerized in the presence of the alkoxy silane external donor component contain longer number-average sequence lengths of propylene than the copolymers polymerized with no alkoxy silane external donor component.

FIG. 1 graphically illustrates how the tensile strength and the dyads mole % vary with the Al/Si ratio. As the Al/Si ratio is decreased to below 50, the tensile strength of the copolymers increases significantly, reaching values of 600 to 800 psi. Simultaneously, as the mole percent PP dyads decreases, the mole percent BB dyads decreases and the mole percent PB dyads remains essentially unchanged. Without wishing to be bound by any particular theory, it is believed that subtle differences in the microstructure of the copolymers polymerized in the presence of the alkoxy silane external donor component within the desired ranges may affect glass transition, needle penetration and even tensile strength and storage modulus values.

The present invention also provides a novel amorphous ethylene/propylene copolymer having an ethylene content of from about 10% to about 30% having increased tensile strength and storage modulus. The amorphous ethylene/propylene copolymer is produced by polymerizing ethylene and propylene in a stirred reactor at a temperature between about 130° F. and 150° F. and at a reactor pressure sufficient to maintain the monomer in the liquid phase. The same catalyst system is used to produce the ethylene/propylene copolymer as is used to produce the propylene/1-butene copolymer described above except that the mole ratio of the alkyl aluminum co-catalyst to the external alkoxy silane donor component, e.g. the Al/Si ratio is much higher, in the range of from about 100:1 to about 500:1.

Several ethylene/propylene polymers having a nominal ethylene content of 15% were polymerized using the catalyst system described above with an external alkoxy silane donor component added to the reactor as a diluted solution in heptane. The average residence time in the reactor was between 1 and 3 hours and sufficient catalyst quantities were fed to the reactor to result in a polymer concentration in the reactor slurry of from about 10wt % to about 50 wt %. The reactor effluent was withdrawn from the reactor and hydrogen and unreacted monomer was flashed from the product polymer. Samples of the ethylene/propylene copolymers produced using the external alkoxy silane donor component were tested and analyzed using $^{13}$C NMR spectroscopy and standard ASTM test methods and compared to an ethylene/propylene copolymer having a nominal ethylene content of 15% produced using the same catalyst system without the alkoxy silane external component. Reaction conditions and the results of the tests and analysis are set forth in Table 6 below:

TABLE 6

| EXAMPLE NO. | 10 | 11 | 12 | 13 | 14 |
|---|---|---|---|---|---|
| Al/Si Mole Ratio | no donor | 600 | 500 | 300 | 100 |
| Al/Ti, mol ratio | 470 | 415 | 420 | 430 | 290 |
| Ethylene, lbs/hr | 7.7 | 8.8 | 8.8 | 7.6 | 6.8 |
| Propylene, lbs/hr | 120 | 120 | 120 | 120 | 120 |
| Hydrogen, lbs/hr | 0.70 | 1.35 | 1.52 | 1.80 | 1.60 |
| CMDMS, mmoles/hr | 0 | 0.32 | 0.40 | 0.64 | 2.0* |
| Reactor Temperature (°F.) | 155 | 145 | 145 | 135 | 140 |
| Reactor Pressure (psig) | 530 | 530 | 540 | 560 | 540 |
| Catalyst Activity, lbs/lb. cat. | 28,000 | 24,600 | 22,000 | 21,000 | 13,500 |
| Melt Viscosity, cps | 3500 | 4000 | 6700 | 7000 | 7700 |
| Ring and Ball Softening Point, °F. | 265 | 264 | 280 | 285 | 285 |
| Needle penetration, 0.1 mm | 45 | 30 | 24 | 10 | 5 |
| wt. % ethylene | 16.3 | 16.8 | 17.0 | 16.4 | 16.5 |
| wt. % propylene | 83.7 | 83.2 | 83.0 | 83.6 | 83.5 |
| PP dyad, mole % | 62.2 | 58.7 | 58.9 | 61.5 | 61.4 |
| PE dyad, mole % | 32.5 | 34.4 | 34.9 | 32.0 | 30.4 |
| EE dyad, mole % | 5.3 | 6.8 | 6.2 | 6.5 | 8.2 |
| PPP triad, mole % | 47.6 | 50.6 | 47.7 | 50.9 | 55.0 |
| PPE triad, mole % | 23.8 | 23.0 | 25.2 | 21.0 | 20.3 |
| EPE triad, mole % | 7.5 | 6.3 | 5.3 | 6.9 | 4.2 |
| PEP triad, mole % | 12.5 | 10.3 | 12.4 | 11.6 | 9.2 |
| EEP triad, mole % | 7.5 | 7.1 | 7.1 | 6.9 | 7.3 |
| EEE triad, mole % | 1.1 | 2.8 | 2.4 | 2.7 | 4.0 |
| E(1), mole % | 53.3 | 52.4 | 54.8 | 52.1 | 47.4 |
| E(2), mole % | 27.2 | 18.5 | 19.4 | 21.3 | 18.2 |
| E(3)** mole % | 19.5 | 29.2 | 25.8 | 26.6 | 34.3 |
| Heat of Fusion (J/g) | 2.0 | 7.8 | 7.5 | 14.4 | 13.2 |
| Heptane Insolubles, wt % | 7.0 | 0 | 0 | 0 | 0 |
| Glass Transition Temp. (°C.) | −37 | −48 | −47 | −47 | −50 |
| Storage Modulus (MPa) | 0.8 | — | 3.4 | 8.3 | — |
| Elongation @ Break | 200 | 50 | 65 | 30 | 50 |
| Tensile Strength @ Break (psi) | <50 | 65 | 100 | 260 | 350 |
| m/r | 3.6 | 3.9 | 5.0 | 7.2 | 5.0 |
| Ir, mole % | 0.26 | 0.07 | 0.07 | 0.10 | 0.07 |

*Phenyl triethoxy silane (PES)
**three or more consecutive units

As indicated in Table 6 above, copolymers having ethylene contents of 17.0 wt % (example 12), 16.4 wt % (example 13) and 16.5 wt % (example 14) prepared with an alkoxy silane external component such that the Al/Si ratios were 500 (example 13), 300 (example 13) and 100 (example 14) exhibited tensile strengths of 100 psi, 260 psi and 350 psi, respectively. The copolymers exhibited melt viscosities of 6700 (example 12), 7000 (example 13) and 7700 (example 14), ring and ball softening points of 280 (example 12), 285 (example 13) and 285 (example 14), needle penetration values of 24 (example 12), 10 (example 13) and 5 (example 140). The copolymers of Examples 12–14 also exhibited glass transition temperatures of −47° C. (example 12), −47° C. (example 13) and −50° C. (example 14) and heats of fusion of 7.5 J/g (example 12), 14.4 J/g (example 13) and 13.2 J/g (example 14).

E(1), E(2), and E(3) are the concentrations in mole percent of only the ethylene incorporation. Thus, E(1) is the percent of total ethylene inserted as a single monomer. E(2) is the percent of ethylene inserted as an ethylene-ethylene dyad and E(3) is the percent of the total ethylene inserted as a block of at least three ethylene units.

The m/r or tacticity index is described in U.S. Pat. No. 4,859,757 issued Aug. 22, 1989 to Pellon et al., the disclosure of which is incorporated herein for all purposes. The tacticity index is determined using $^{13}$CNMR where "m" and "r" describe the stereochemistries of pairs of contiguous propylene groups bonded to one or more ethylene groups, "m" referring to meso and "r" to racemic. Ir is a measure of propylene inversion and is also described in U.S. Pat. No. 4,859,757.

As indicated above, the percentage of ethylene present as at least a block of three ethylene units in the ethylene/propylene copolymers of Examples 12 and 13 is more than twice as great as in the copolymer of Example 10 which was polymerized with the same catalyst system without the alkoxy silane donor. While not being bound by any particular theory, the difference in the way the ethylene is inserted into the ethylene/propylene copolymer of the present invention when the external alkoxy silane donor component is present is believed to contribute to the enhanced tensile properties of the copolymer. For example, the tensile strength of the copolder of Example 13, polymerized with alkoxy silane external donor in an amount such that the Al/Si ratio was 300, is 400% greater than the tensile strength of the copolymer of Example 10 which was polymerized without the donor. Similarly, the tensile strength of the copolymer of Example 12, in which case the Al/Si ratio was 500, was at least 100% greater than the tensile strength of the copolymer of Example 10. Similar results are observed with the storage modulus values. However, at an Al/Si ratio of 600, the increase in tensile strength attributed to the use of the alkoxy silane external donor during polymerization, has substantially declined. At Al/Si ratios less than 100 reactor performance is adversely impacted.

An indication of the amorphous nature of the ethylene/propylene copolymers of Examples 12 and 13 is the lack of crystallinity as measured by the heptane insoluble content of the copolymers. The ethylene/propylene copolymers of Examples 12–14 contain no heptane insoluble material. Heptane insolubles were determined by Soxhlet extraction of a sample of the copolymer with boiling heptane for six hours.

While particular embodiments of the present invention have been illustrated and described, it will be apparent to those skilled in the art that various changes and modifications may be made without departing from the spirit and scope of the invention.

We claim:

1. A process for the production of amorphous ethylene/propylene copolymers comprising:

feeding a mixture consisting essentially of ethylene and propylene monomers and hydrogen to a reactor at an ethylene:propylene weight ratio of from 6.8:120: to 8.8:120: and a hydrogen:propylene weight ratio of from 1.52:120 to 1.80:120 and reacting the ethylene and propylene monomers and hydrogen at a temperature of between 135° F. to 145° F. and at a pressure between 540 and 560 psig in the presence of a catalyst system consisting essentially of:

(a) a solid supported catalyst component prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0;

(b) a trialkylaluminum co-catalyst, having from 1 to 9 carbon atoms in each alkyl group in an amount such that the Al/Ti ratio is between about 290:1 to about 430:1; and (c) an alkoxy silane component of the formula $R_nSi(OR')_{4-n}$ where n=1–3, R=aryl or alkyl and R'=$C_{1-3}$ alkyl in a sufficient quantity such that the molar ratio of organoaluminum co-catalyst to alkoxy silane is in the range from about 100:1 to about 500:1;

producing an amorphous ethylene/propylene copolymer, said amorphous copolymer consisting essentially of from about 16.4 wt % to about 17 wt % ethylene, and from about 83.6 to about 83.0 wt % propylene, a tensile strength of from 100 to 350 psi, a melt viscosity between 6700 and 7700 a glass transition temperature between –47° C. and –50° C., a ring and ball softening point from between 280° F. and 285° F., a needle penetration of from between 5 and 24 a heat of fusion from 7.5 J/g to 14.4 J/g, said copolymer containing no heptane insolubles.

2. The process of claim 1 wherein the alkoxy silane is selected from the group consisting of cyclohexyl methyl dimethoxy silane and phenyl triethoxy silane, and wherein the alkoxy silane component is present in a sufficient quantity such that the molar ratio of organoaluminum co-catalyst to alkoxy silane is in the range from about 100:1 to about 500:1.

3. The process of claim 1 wherein the alkoxy silane is selected from the group consisting of dimethyl diethoxy silane, dodecyl triethoxy silane, methyl phenyl diethoxy silane, methyl octyl dimethoxy silane and methyl triethoxy silane, and wherein the alkoxy silane component is present in a sufficient quantity such that the molar ratio of organoaluminum co-catalyst to alkoxy silane is in the range from about 100:1 to about 500:1.

* * * * *